United States Patent [19]

Lipo et al.

[11] Patent Number: 5,646,498
[45] Date of Patent: Jul. 8, 1997

[54] CONDUCTED EMISSION RADIATION SUPPRESSION IN INVERTER DRIVES

[75] Inventors: Thomas A. Lipo, Middleton; Er-Kuan Zhong, Madison, both of Wis.

[73] Assignee: Eaton Corporation, Cleveland, Ohio

[21] Appl. No.: 511,821

[22] Filed: Aug. 7, 1995

[51] Int. Cl.⁶ .................. H02M 5/458; H02M 7/162
[52] U.S. Cl. .................. 318/800; 318/811; 363/40; 363/37
[58] Field of Search .................. 318/700–832; 361/35; 307/46, 105; 363/89, 81, 37, 40, 132, 43, 127, 39, 136, 126; 323/222, 207, 285

[56] References Cited

U.S. PATENT DOCUMENTS

| | | | |
|---|---|---|---|
| 3,903,469 | 9/1975 | Ravas | 321/9 R |
| 4,651,266 | 3/1987 | Fujioka et al. | 363/39 |
| 4,730,242 | 3/1988 | Divan | 363/37 |
| 4,812,669 | 3/1989 | Takeda et al. | 363/98 |
| 4,864,483 | 9/1989 | Divan | 363/37 |
| 5,319,534 | 6/1994 | Brennen | 363/40 |
| 5,319,535 | 6/1994 | Brennen | 363/40 |
| 5,343,079 | 8/1994 | Mohan et al. | 363/40 |
| 5,355,295 | 10/1994 | Brennen | 363/40 |
| 5,523,937 | 6/1996 | Kahkipuro | 363/37 |

*Primary Examiner*—Paul Ip
*Attorney, Agent, or Firm*—Jennifer M. Stec

[57] ABSTRACT

An inverter-driven induction motor system having input lines (12,14,16) for receiving a three-phase ac input signal which is converted into a dc signal and transmitted on dc bus lines (24,26) before gated into a three-phase alternating current output signal transmitted to the motor on output lines (34,36,38). A four winding common mode inductance (L1) is connected on the output side with an inductance connected to the motor ground wire (42). A ground wire choke (Lg) is also added to further reduce conducted emitted radio frequency noise or interference. A third order filter and grounding capacitance (C14,C15,C16) are further added to the ac input side to improve EMI performance.

18 Claims, 5 Drawing Sheets ns 5,646,498

CONDUCTED EMISSION RADIATION SUPPRESSION IN INVERTER DRIVES

BACKGROUND AND SUMMARY OF THE INVENTION

This invention relates generally to inverter-driven induction motor systems and, more particularly, to a system and method for significantly reducing the undesirable radio frequency energy emitted from the inverter drive system.

Adjustable frequency drives for controlling the speed of an induction motor are well known. Such drives often comprise a static inverter for rectifying a three-phase alternating current (ac) input signal into a direct current (dc) intermediate signal which is then chopped into a variable voltage, variable frequency ac output signal used to drive the motor. These inverters may be of several types, one common type including power switching elements such as insulated gate bipolar transistors (IGBTs) gated by pulse width modulation (PWM) firing signals.

However, such IGBT-based inverters can emit excessive radio frequency (rf) energy often referred to as electromagnetic interference (EMI). High IGBT firing speeds can induce current changes from 1000-3000 amps/μsec and voltage changes up to 5000-6000 V/μsec, these changes appearing as edges on the PWM waveform. The leads from the inverter drive to the motor act as an antenna, transmitting this high frequency energy into space as interference. All power lines in the surrounding vicinity, including the power line to the inverter itself, then act as receiving antennas, picking up the emitted energy. This undesirable excess energy can interfere with certain types of equipment, particularly radios, computers and other such electronic devices. With increasingly stringent limits being put on the amounts of such interfering emissions, such as those contained in the proposed standards of the CISPR (International Special Committee on Radio Interference), inverter manufacturers have had to address electromagnetic capability and find further ways to ameliorate the effects caused by high dv/dt switching common with modern IGBTs.

The system and method of the present invention address this concern by providing a low cost solution to excess radiation conduction and emission from IGBT-based inverter drives. To accomplish this, a four winding common mode inductance is added on the output side of the inverter drive. A ground wire choke as well as capacitive and inductive filtering elements are also added to the inverter input circuitry to reduce EMI. These modifications provide an inverter drive system well within compliance with the newly emerging standards. In addition, they are relatively low in cost and are readily implemented.

These and other features and advantages of the present invention will become apparent upon review of the following description, taken in conjunction with the accompanying drawings.

DETAILED DESCRIPTION OF THE PREFERRED EMBODIMENT

Figure 1:
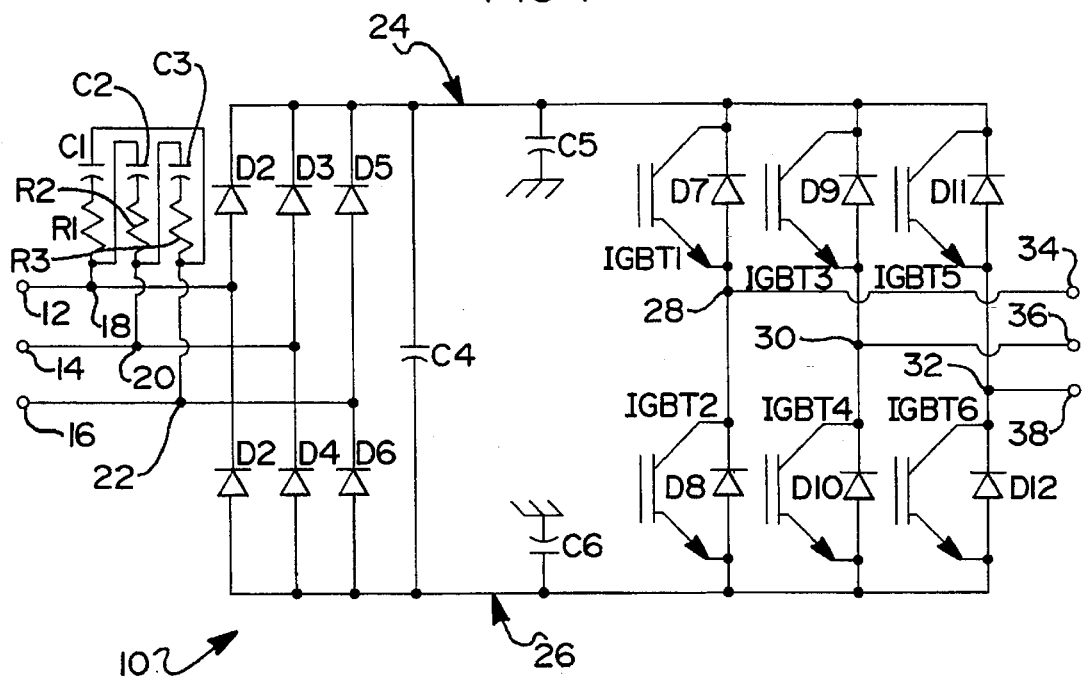
FIG. 1 is a schematic circuit diagram of a typical IGBT-based inverter.

Turning now to the drawings, and in particular to FIG. 1, a typical IGBT-based inverter circuit is illustrated generally at 10. Circuit 10 receives a three-phase ac input signal on main input lines 12, 14 and 16. Node 18 on input line 12 is connected through a resistor R1 and capacitor C1 to a node 22 on input line 16. Node 22 is also coupled to a series connected resistor R3 and capacitor C3 to a node 20 on input line 14. Similarly, node 20 is coupled through resistor R2 and capacitor C2 to node 18. This line to line capacitance is connected between the input ac mains of inverter 10, resistors R1, R2, R3 providing damping. While the present invention will be described for purposes of example with reference to inverter drive 10, one having skill in the art will find it readily apparent that the teachings herein are equally well suited to inverter circuits of many other configurations as well.

Node 18 of inverter 10 is further connected to a dc bus line 24 through a diode D1, and to dc bus line 26 through diode D2. In like fashion, node 20 is connected between bus lines 24 and 26, through diodes D3 and D4, respectively, and node 22 through diodes D5 and D6. A large capacitor C4 connects line 24 to line 26 so as to perform low frequency power line filtering. Capacitors C5 and C6 are connected between lines 24 and 26 respectively, and ground. These capacitors are connected as grounding capacitances from both sides of the dc bus (positive and negative) to the heat sink (or ground), the connections preferably being made as close as possible to IGBT switching devices in the circuit. These grounding capacitors compensate for common mode currents flowing from the switching devices through parasitic capacitance, including currents from the semiconductor to the heat sink of the switching devices, from the motor three-phase power leads to the ground wire and from the motor stator windings to the motor frame. While capacitors C5 and C6 can sometimes cause minor current leakage, this is generally not a problem in industrial power equipment applications, which typically must be well grounded. Ground leakage current limit requirements would therefore not apply to power conversion and the selection of capacitances C5 and C6 in this case.

A pair of insulated gate bipolar transistors IGBT1 and IGBT2 are connected in series between dc bus lines 24 and 26 with a node 28 between the devices connected to an inverter output line 34. IGBT1 has its collector electrically connected to line 24 and its emitter to node 28. A diode D7 is coupled therebetween, having its anode connected to node 28, and therefore the emitter of IGBT1, and its cathode to line 24 and the IGBT1 collector. IGBT2 has its collector electrically coupled to node 28 and its emitter to line 26, with diode D8 connected therebetween. In a similar fashion node 30, connected between IGBT3 and IGBT4 is connected to output 36 and node 32 coupled between IGBT5 and IGBT6 to output 58. Diodes D9, D10, D11 and D12 are coupled between the emitter and collector of IGBT3, IGBT4, IGBT5 and IGBT6, respectively. The IGBTs are each electrically coupled to a microprocessor (not shown) which provides PWM signals used to gate the IGBTs, thereby controlling the voltage and frequency of the signals output on lines 34, 36 and 38. Output lines 34, 36 and 38 are electrically connected to the motor being driven (not shown).

Figure 2:
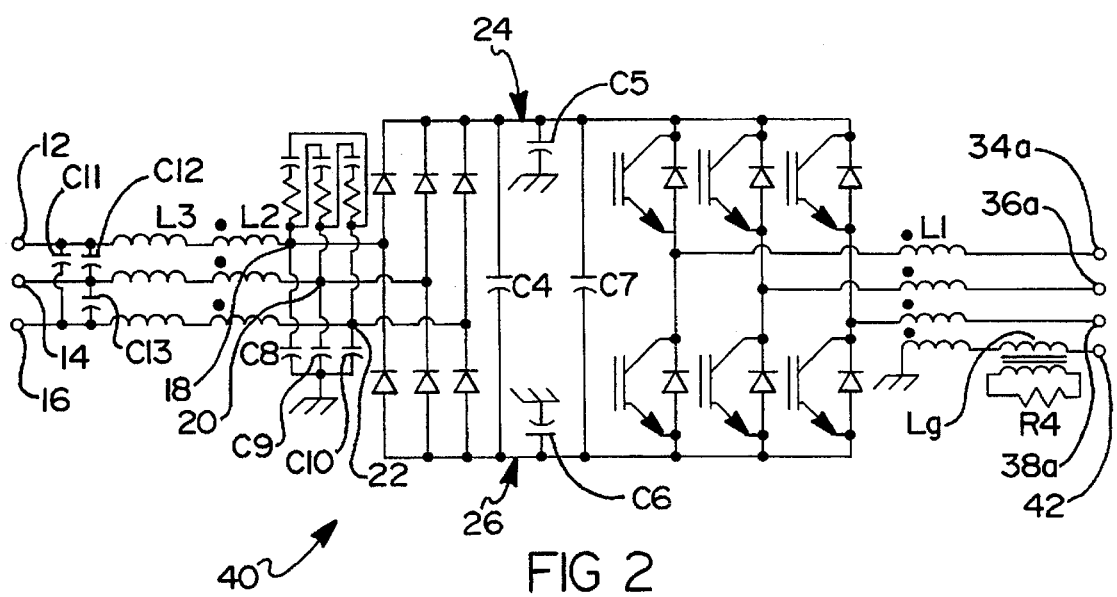
FIG. 2 is a schematic circuit of the inverter shown in FIG. 1, as modified with the circuit elements of the present invention to produce an inverter having significantly improved EMI performance.

Turning now to FIG. 2, a modified inverter having improved emission performance capabilities, as made in accordance with the teachings of the present invention, is indicated generally at 40. Circuit 10 of FIG. 1 is modified herein to form circuit 40 which additionally includes a dc bus capacitance, in the form of capacitor C7, connected across dc bus lines 24 and 26, preferably with leads which are as short as possible. This capacitance compensates for the differential mode currents flowing from the switching devices at one side of the dc link (i.e. IGBT1, IGBT3 and IGBT5) through a distributed capacitance and back to the switching devices at the other side of the dc link (i.e. IGBT2, IGBT4 and IGBT6).

These type of noise currents include the currents produced between the windings in different phases of the motor, the currents produced between the power leads in different phases and the currents produced by junction capacitance of the switching devices under switching transients. Due to the voltage rise rate (dv/dt) in the power circuit as well as related capacitances, a substantial amount of impulse noise current can be expected. Therefore, the capacitance of capacitor C7 is large and preferably selected to be about one thousand times the distributed capacitance of the drive system, with a low ESR at high frequencies, to keep the voltage disturbance under switching transient as low as possible, preferably much less than one volt.

A four coil transformer L1 is connected to the ac output of inverter 10. In this regard, three of the coils of transformer L1, connected to output lines 34, 36 and 38, respectively, provide high impedance to a second type of common mode current, being generated by all leads including that extending from the ground wire to the motor load, under high dv/dt transients and flowing back to the power mains of the inverter. A fourth coil of transformer L1 is connected to a motor ground wire 42. A ground wire choke which includes inductance Lg is further provided on ground wire 42, connected in series with one coil of transformer L1 with the second winding thereof terminated with a resistor R4 for damping. Ground wire choke Lg serves to suppress ground current flowing back from the motor ground wire while the motor frame is isolated from the ground plane. As the ground wire current is typically just a few amperes, the rating of Lg can be far smaller than that for L1.

A second transformer L2 having coils connected to inputs 12, 14 and 16, respectively, preferably a three winding coupled transformer in one magnetic core, creates a common mode inductance which, in combination with capacitors C5 and C6, constitute a second order filter for common mode noise filtering.

Capacitors C8, C9 and C10, each connected between respective nodes 18, 20 and 22 and ground, provide compensation for non-linear effects of a diode rectifier, audio-rectification effect. This capacitance in parallel connects a grounding capacitance from the three phase input ac mains close to the main diode rectifier to the chassis of the inverter.

A transformer L3 has coils connected in series between the coils of transformer L2, opposite nodes 18, 20 and 22 in each phase of the input ac mains of inverter 40. Capacitors C11, C12 and C13 are connected in a delta configuration between the input ac mains of inverter 40 as a line to line capacitance. These capacitors along with transformer L3, as well as capacitors C1, C2 and C3, constitute a third order filter with a corner frequency of 50 kHz for suppression of differential mode noise current caused by non-linear effects of the diode rectifier.

Figure 3:
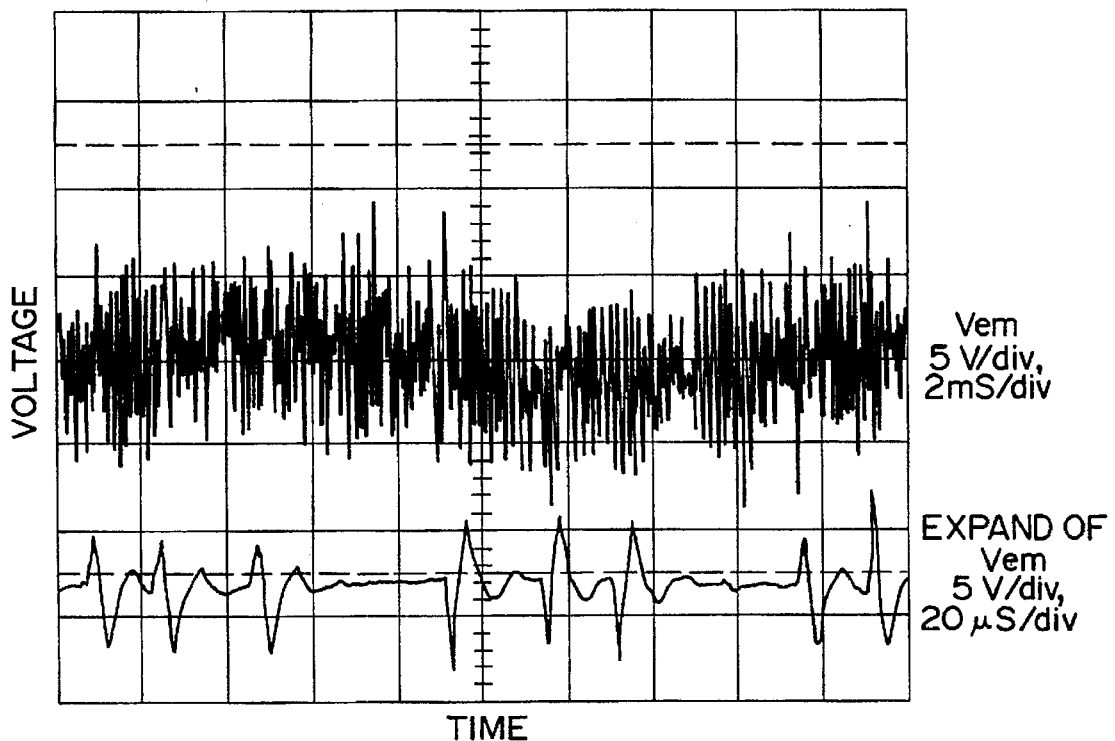
FIG. 3 is a graphic representation of the conducted emission noise voltage waveform (shown with respect to time) for the inverter shown in FIG. 1, with the inverter-motor operating at 30 Hz.
Figure 4:
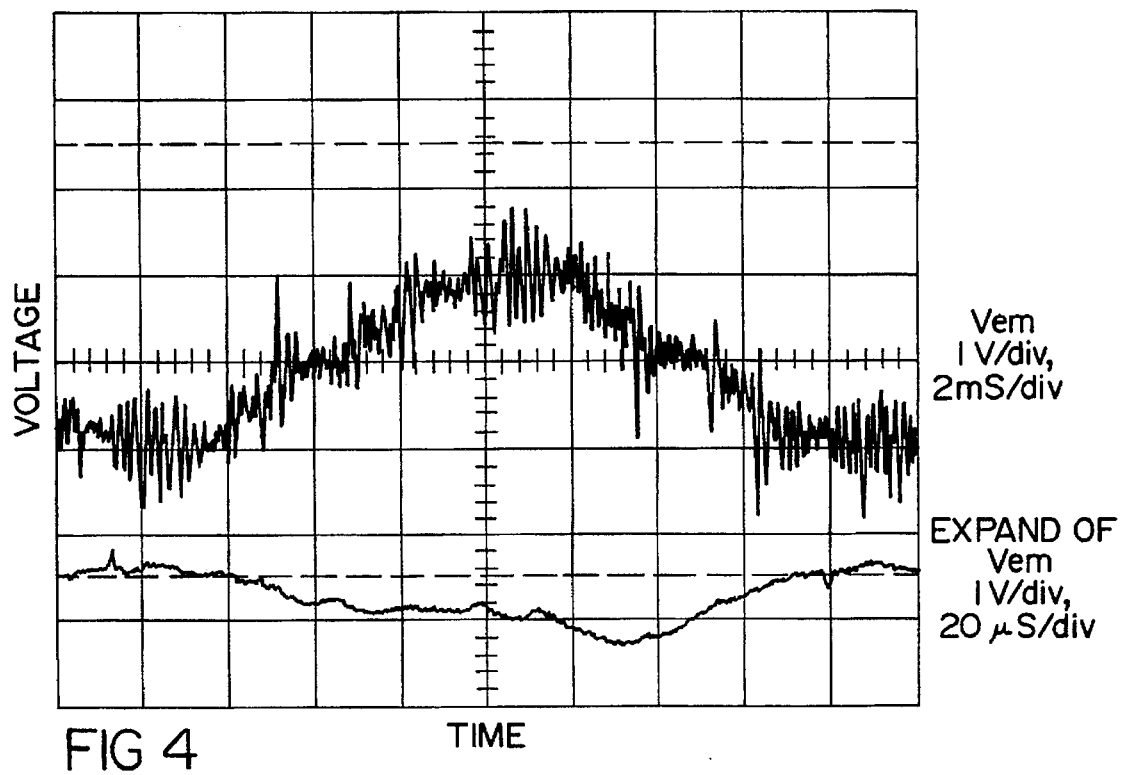
FIG. 4 is a graph similar to FIG. 3 showing the same waveform for the modified inverter illustrated in FIG. 2, the inverter-motor also operating at 30 Hz.

The results of the modifications made to the inverter circuit 10 shown in FIG. 1 to create the inverter 40 of FIG. 2 are best illustrated by reference to the graphs of FIGS. 3–11. For instance, FIG. 3 illustrates the conducted emission noise voltage (Vem) for the original inverter 10, this voltage plotted with respect to time. FIG. 4, in contrast, shows the noise voltage for the modified inverter drive 40 of FIG. 2. Looking more closely at these graphs, and particularly at the high frequency components more apparent in the expanded traces, it can be seen that since the voltage scale of FIG. 3 is 5 volts per division, the peak to peak noise voltage level is almost 10 volts. The modified inverter 40 exhibits peak to peak noise voltage of only 1 volt, FIG. 4 being in units of one volt per division.

Figure 5:
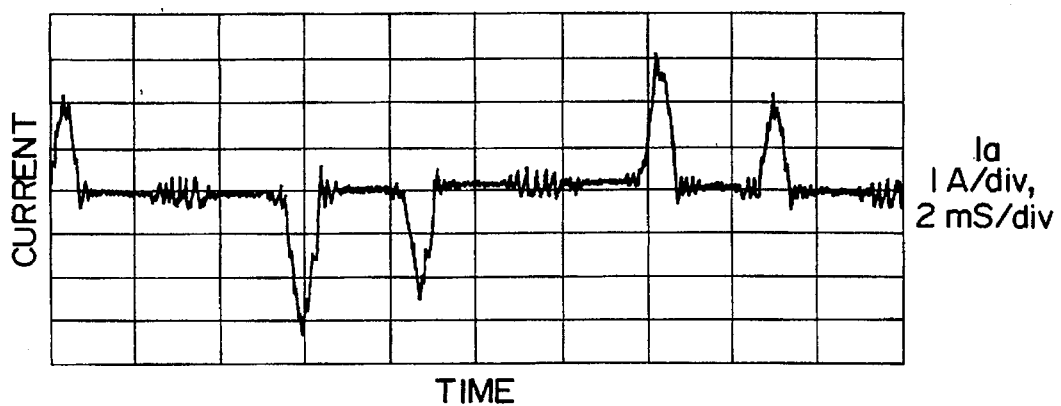
FIG. 5 is a graph of the power line current for the unmodified inverter with the inverter-motor operating at 30 Hz.
Figure 6:
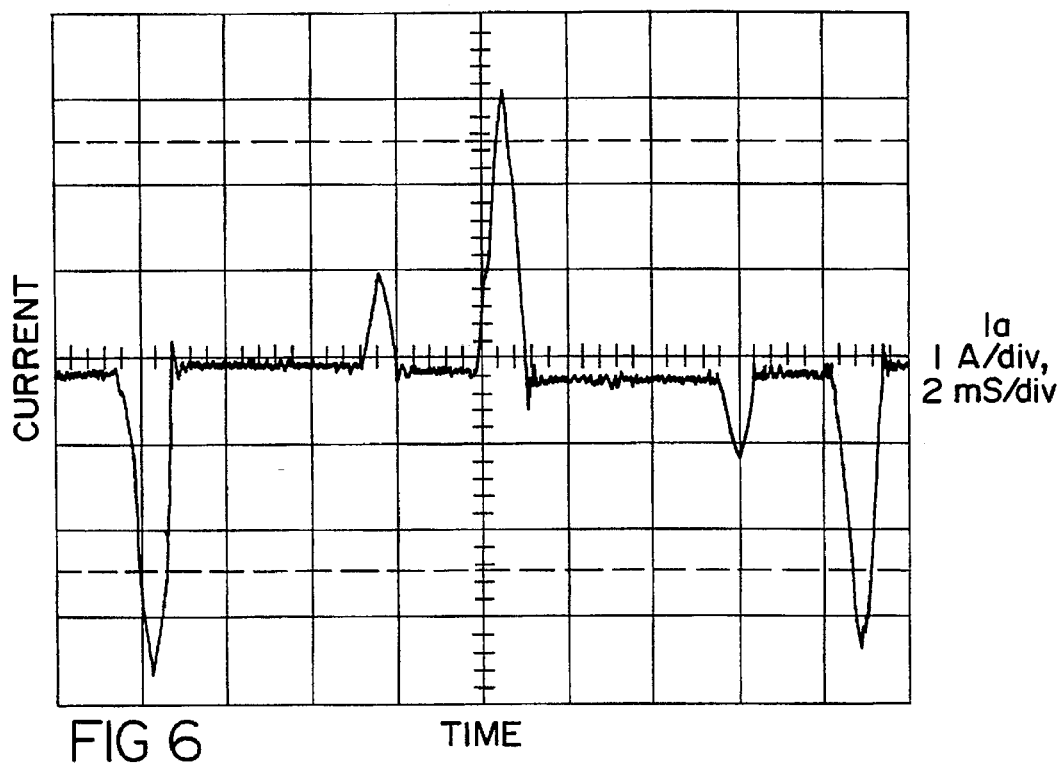
FIG. 6 is a graph similar to FIG. 5 showing the power line current in the modified inverter.

FIGS. 5 and 6 similarly contrast the differences between the power line currents in the original and modified inverters, 10 and 40, respectively. Comparing the expanded traces in these figures, it is clear that the current transmitted by the power line for inverter 10 is more noisy than in inverter 40 as modified by the present invention.

Figure 7:
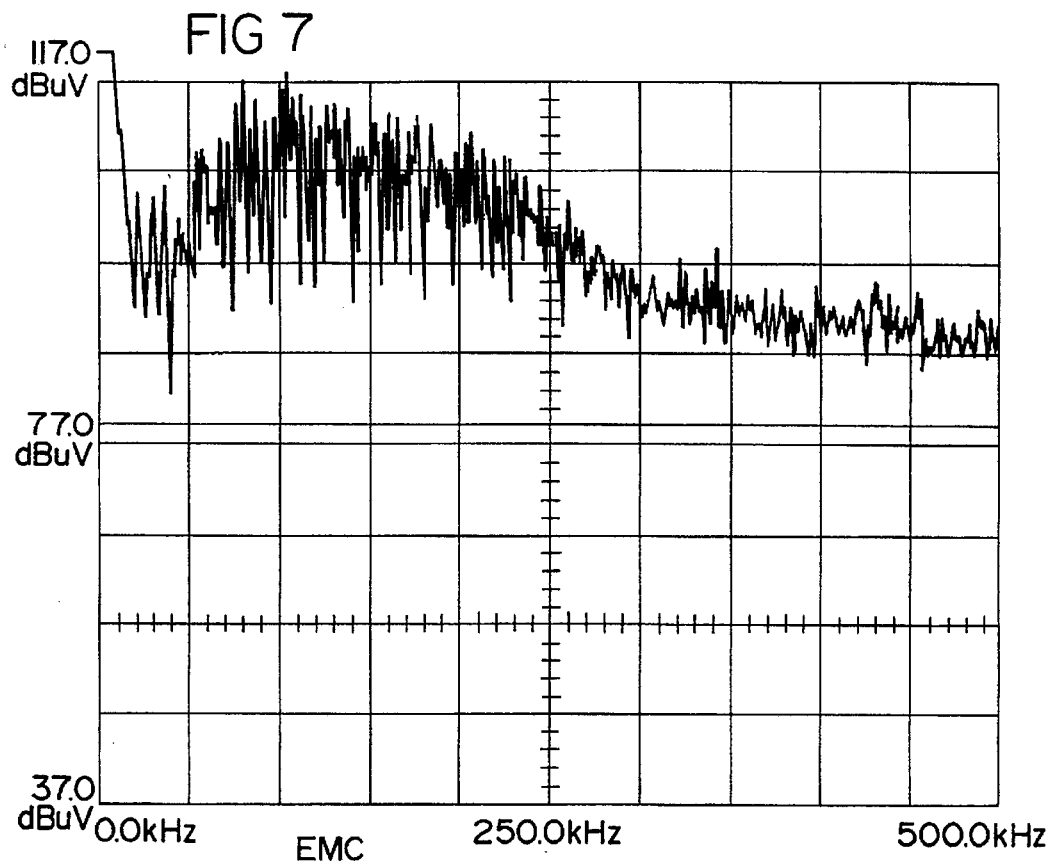
FIG. 7 is a graph which illustrates the conducted emission noise level of the inverter of FIG. 1 with the inverter-motor operating at 30 Hz.
Figure 8:
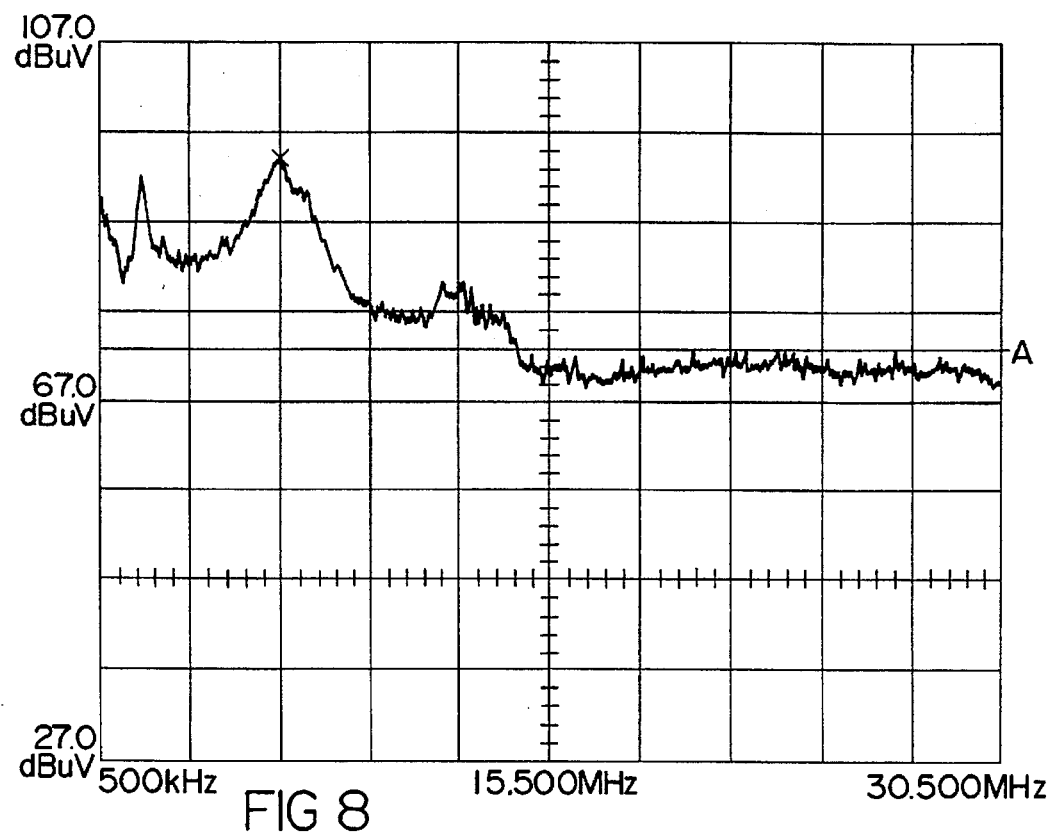
FIG. 8 is a graph similar to FIG. 9 for the same inverter, the noise levels shown being at higher frequencies than those shown in FIG. 9.
Figure 9:
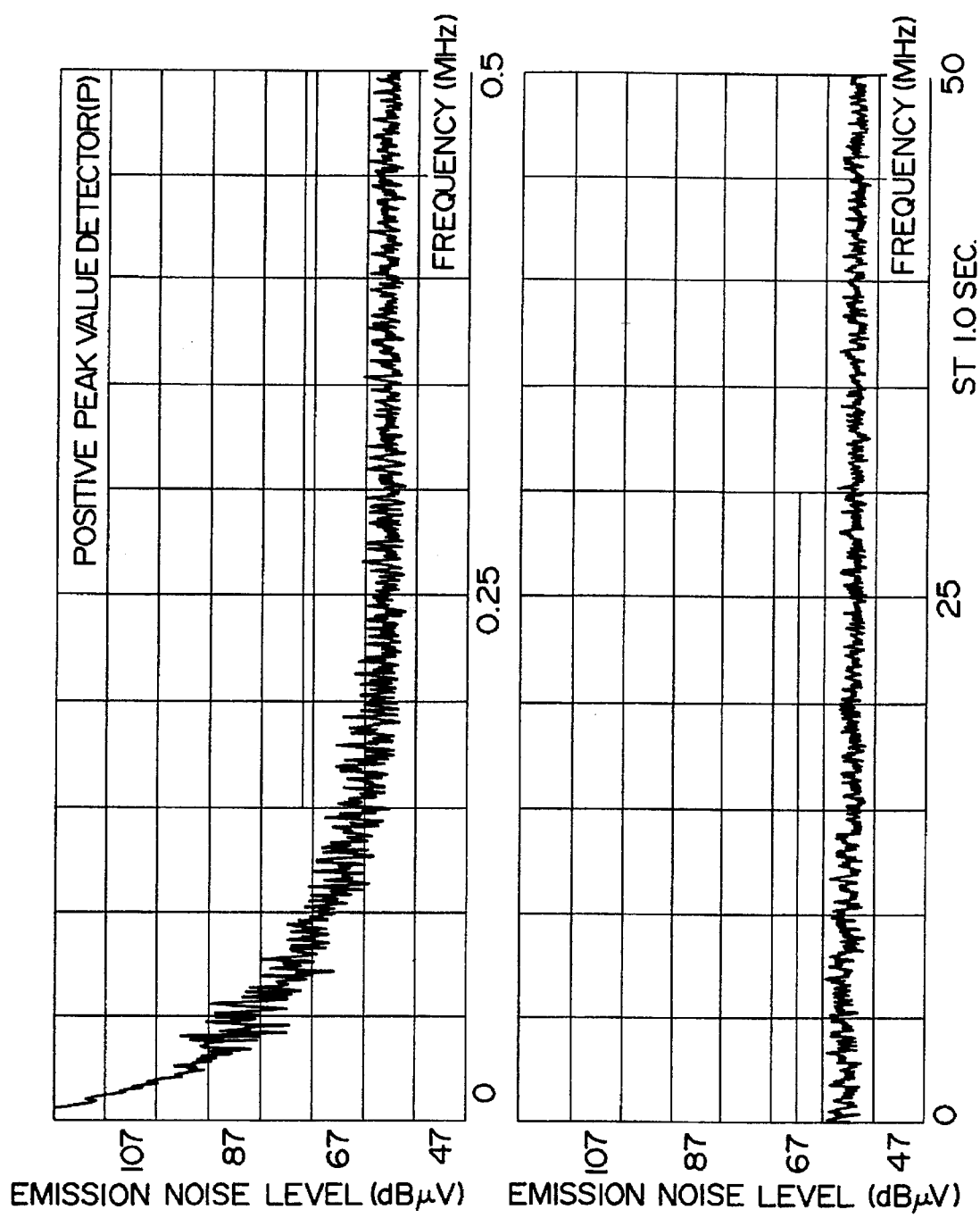
FIG. 9 is a graph showing the emission noise level for the modified inverter of FIG. 2.

FIGS. 7 and 8 illustrate the conducted emission noise level of inverter 10, by frequency. FIG. 7 illustrates the noise at frequencies between 0 and 500 kHz, and FIG. 8 from 500 kHz to 30.5 MHz. As seen in FIG. 7, the peak noise level is approximately 110 dBµV, occurring at about 100 kHz. FIG. 9 shows the noise level at 100 kHz for modified inverter 40 to be around 77 dBµV, a significant improvement. Thus, the present invention provides a cost effective solution to meet and exceed electromagnetic emission standards in the United States and abroad.

For the sake of clarity, the values of the electrical components used in the exemplary embodiment of the present invention were omitted from FIGS. 1 and 2. For completeness, they are included herebelow for an implementation on a 20 horsepower PWM inverter drive, for reducing conducted emitted rf energy from industrial drives in the 150 kHz to 30 MHz band. These components produce a total additional weight of about one and one half pounds and are able to be incorporated into the inverter itself. However, it should be readily apparent to one with skill in the art that these component values will change with various implementations and inverter circuit parameters.

| Resistors | Capacitors | Transformers |
| --- | --- | --- |
| R1 5Ω | C1 .1 µF | L1 300 µH |
| R2 5Ω | C2 .2 µF | L2 850 µH |
| R3 5Ω | C3 .2 µF | L3 28 µH |
| R4 2kΩ | C4 2400 µF | |
| | C5 .1 µF | Lg 2.5 µH |
| | C6 .1 µF | |
| | C7 6 µF | |
| | C8 .015 µF | |

-continued

| Resistors | Capacitors | Transformers |
| --- | --- | --- |
|  | C9 .015 µF |  |
|  | C10 .015 µF |  |
|  | C11 .22 µF |  |
|  | C12 .22 µF |  |
|  | C13 .22 µF |  |
|  | C14 .015 µF |  |
|  | C15 .015 µF |  |
|  | C16 .015 µF |  |

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the present invention as defined in the following claims.

What is claimed is:

1. An inverter-driven induction motor drive system comprising:
   a plurality of input lines adapted to receive a three-phase alternating current input signal;
   a rectifier circuit for converting said alternating current input signal into a direct current signal;
   a gating circuit for converting said direct current signal into a variable voltage, variable frequency three-phase alternating current output signal for controllably driving said motor;
   a plurality of output lines electrically connected between said gating circuit and said motor;
   a ground wire electrically connecting said motor to ground; and
   a four winding common mode inductance electrically connected in series between said output lines and at least one of said gating circuit and said ground wire for reducing the electromagnetic interference produced by said system.

2. The system of claim 1 wherein said common mode inductance includes a four coil transformer.

3. The system of claim 2 wherein three coils of said transformer are connected to said output lines and said fourth coil is connected to said ground wire.

4. The system of claim 1 further comprising a ground wire choke.

5. The system of claim 4 wherein said ground wire choke includes an inductance and a resistance.

6. The system of claim 1 further comprising an electrical filter connected to said input lines.

7. The system of claim 6 wherein said filter includes an inductance.

8. The system of claim 7 wherein said inductance comprises a three winding transformer.

9. The system of claim 6 wherein said filter includes a grounding capacitance on said input lines.

10. The system of claim 9 wherein said capacitance includes three capacitors connected in a delta configuration.

11. The system of claim 1 wherein said dc signal is carried on a pair of dc bus lines and said system further comprises a capacitance connected across said bus lines.

12. The system of claim 1 wherein said gating circuit is controlled by a pulse width modulated signal.

13. In an inverter-driven induction motor drive system including a plurality of input lines adapted to receive a three-phase alternating current input signal, a rectifier circuit for converting said alternating current input signal into a direct current signal, a gating circuit for converting said direct current signal into a variable voltage, variable frequency three-phase alternating current output signal for controllably driving said motor, a plurality of output lines electrically connected between said gating circuit and motor and a ground wire electrically connected between said motor and ground, a method for reducing the electromagnetic interference generated by said motor drive system, said method comprising the step of:
   electrically connecting three windings of a four winding common mode inductance in series between said gating circuit and said output of said drive system, and connecting a fourth winding in series between said output and said ground wire.

14. The method of claim 13 wherein said common mode inductance includes a transformer and wherein three coils of said transformer are connected to said output lines and a fourth coil is connected to said ground wire.

15. The method of claim 13 further comprising the step of electrically connecting a ground wire choke to said ground wire.

16. The method of claim 15 further comprising the step of connecting a filter to said input lines.

17. The method of claim 16 wherein said filter includes a grounding capacitance.

18. An inverter drive system for controllably driving an induction motor comprising:
   a set of three input lines adapted to receive a three-phase alternating current input signal;
   a rectifier circuit for converting said alternating current input signal into a direct current signal; said direct current signal being transmitted over a pair of dc bus lines;
   a gating circuit electrically connected to said bus lines, said gating circuit being driven by a microprocessor to convert said direct current signal into a variable voltage, variable frequency three-phase alternating current output signal for driving said motor;
   a ground wire;
   a four coil transformer, one coil of said transformer being electrically connected to said ground wire and the three remaining coils each electrically coupled to said three output lines;
   a ground wire choke electrically connected to said ground wire; and
   an electrical filter connected to said input lines.

* * * * *